(No Model.)
R. A. BOYD.
BACK SUPPORT FOR BICYCLES.
No. 524,753.    Patented Aug. 21, 1894.
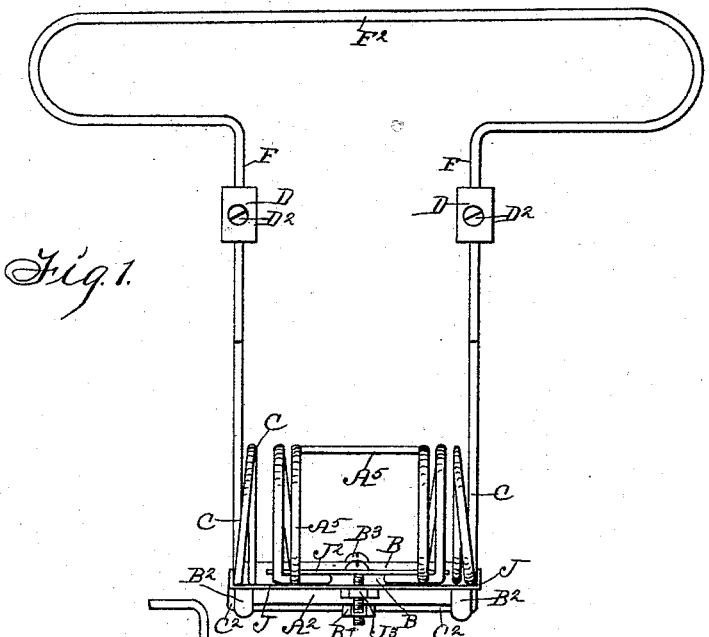
Fig. 1.
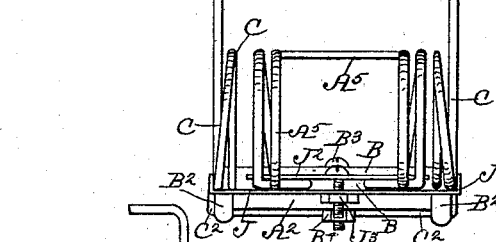
Fig. 2.
Fig. 3.
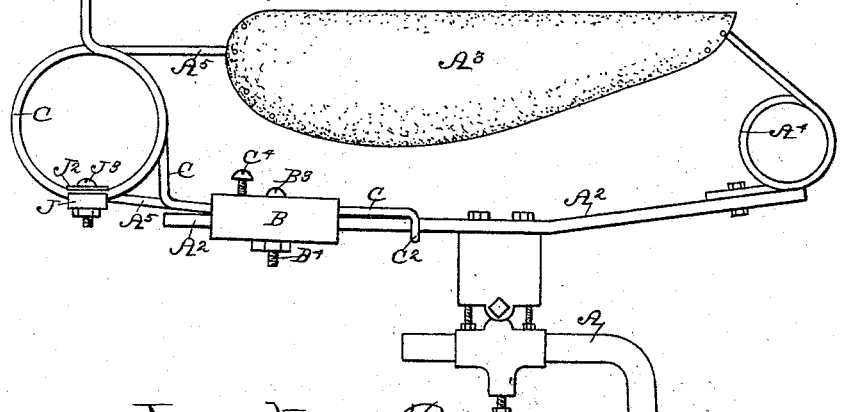
Witnesses:
J. Ralph Orwig
R. H. Orwig
Inventor: Robert A. Boyd,
By Thomas G. Orwig, Attorney.

UNITED STATES PATENT OFFICE.

ROBERT A. BOYD, OF HASTINGS, NEBRASKA.

BACK-SUPPORT FOR BICYCLES.

SPECIFICATION forming part of Letters Patent No. 524,753, dated August 21, 1894.

Application filed May 29, 1893. Serial No. 475,975. (No model.)

*To all whom it may concern:*

Be it known that I, ROBERT A. BOYD, a citizen of the United States of America, residing at Hastings, in the county of Adams and State of Nebraska, have invented a Back-Support for Bicycles, of which the following is a specification.

The object of my invention is to provide a device that may be easily and quickly applied to a bicycle saddle support, and be readily detachable therefrom and adapted to allow a person seated upon the saddle to rest his back thereupon and be sufficiently yielding to promote ease and comfort and at the same time provide a support for the back.

To this end my invention consists in certain details of construction of the back support and the arrangement and combination thereof with a bicycle saddle support as hereinafter set forth, pointed out in my claims and illustrated in the accompanying drawings, in which—

Figure 1 is a rear view of the saddle support, the rear saddle spring and the back support connected therewith. Fig. 2 is a top view of the clamping device for holding the back support and rear saddle spring to the saddle support. Fig. 3 is a side view of a saddle mounted upon part of a bicycle frame and having the back support attached thereto as in practical use.

Referring to the accompanying drawings the reference letter A is used to designate the seat post of a bicycle, $A^2$ is a saddle support connected with said seat post and preferably made of a flat piece of metal.

$A^3$ is the saddle which is of the ordinary construction and is connected with the saddle support by means of a coil spring $A^4$ at its front end, and the spring $A^5$ at its rear. This rear saddle spring is usually clamped to the saddle support. In the present instance I have provided the following means for securing it thereto:

B designates a clamping device adapted to be placed on top of the saddle support, and having the flanges $B^2$ at its sides to overlap said support and prevent a lateral movement of said parts relative to each other. A bolt $B^3$ extended through the clamping device and saddle support and having a nut $B^4$ on its under side produces a detachable connection between said parts and $B^5$ designates grooves formed on the under face of the clamping device to receive the ends of the rear saddle spring and firmly secure it.

C designates a piece of spring metal having a coil formed therein, its ends extended vertically and its central portion is passed forwardly along the saddle support a short distance and then around beneath it at $C^2$. The parallel side pieces of this spring are adapted to be admitted in the grooves $C^3$ formed in the top face of the clamping device B and secured thereon by the set screws $C^4$ which it will be obvious will permit of the longitudinal adjustment of the spring C.

D designates sockets fixed to the tops of the spring C and provided with vertical bores to admit the uprights F of the back support proper and $D^2$ are set screws in said sockets D to intersect the vertical bores and provide means whereby said uprights may be adjustably secured therein.

F designates the back proper, shaped to conform to a person's back. It may be finished in any desirable style and upholstered if preferable. In the present instance however, it is shown to be formed of a single piece of wire that is a continuation of the uprights F.

J designates a flat metal plate having its ends bent upwardly to engage the edges of the coil of the spring C and $J^2$ a second shorter plate to be passed through the said coils and connected with the other by means of a bolt and nut $J^3$ to aid in securing the coil of the rear saddle spring and the coil in the spring C in alignment and to prevent a side movement of the spring C.

In practical operation the device is applied to a bicycle saddle support in the manner set forth and may be adjusted vertically or longitudinally to suit the rider. The spring C tends to overcome the vibrations in the bicycle frame and produce an easy and convenient back support.

Having thus described my invention, what I claim as new therein, and desire to secure by Letters Patent of the United States therefor, is—

1. In combination with a bicycle saddle a clamping device B attached to the saddle support spring C connected with said clamping device as set forth, sockets D secured to the top portions of said spring C and the back support $F^2$ and uprights F connected therewith and adjustably connected with said sockets substantially as set forth.

2. In combination with a bicycle frame, a saddle $A^3$ on the support $A^2$, a spring $A^4$ supporting the front end of said saddle a spring $A^5$ supporting the rear end thereof, a clamping device B connected with the saddle support by the bolt and nut $B^3$ and $B^4$, the grooves $B^5$ on the under face of the clamping device and the grooves $C^3$ in its top face, the set screws $C^4$ to enter said grooves the spring C secured in said clamping device as set forth, sockets D at the tops of said spring, set screws $D^2$ for the purposes set forth, the back $F^2$ supported by the uprights F the plates J and $J^2$ connected by the bolt and nut $J^3$, all arranged and combined substantially in the manner set forth for the purposes stated.

ROBERT A. BOYD.

Witnesses:
GEORGE CRANE,
A. V. COLE.